United States Patent
Grigorovitch et al.

(10) Patent No.: US 7,477,264 B2
(45) Date of Patent: Jan. 13, 2009

(54) COMPOSITING EXTERNAL IMAGES INTO A MULTIMEDIA RENDERING PIPELINE

(75) Inventors: Alexandre V. Grigorovitch, Redmond, WA (US); Jay Senior, Seattle, WA (US); Jonathan M. Cain, Seattle, WA (US); Gurpratap Virdi, Bellevue, WA (US); Sohail Baig Mohammed, Redmond, WA (US); Kirt A. Debique, Seattle, WA (US); Gareth Howell, Kirkland, WA (US); Tim Cowley, Seattle, WA (US); Miguel M. Valdez, Redmond, WA (US); Stephen J. Estrop, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 44 days.

(21) Appl. No.: 11/203,675

(22) Filed: Aug. 12, 2005

(65) Prior Publication Data
US 2007/0035559 A1 Feb. 15, 2007

(51) Int. Cl.
G09G 5/00 (2006.01)
G06T 1/20 (2006.01)
H04N 9/74 (2006.01)
H04N 9/76 (2006.01)

(52) U.S. Cl. ............... 345/629; 345/506; 348/582; 348/589; 348/600

(58) Field of Classification Search ............... 345/629, 345/506; 348/582, 589, 600
See application file for complete search history.

(56) References Cited

U.S. PATENT DOCUMENTS

| | | | | |
|---|---|---|---|---|
| 4,698,666 A | * | 10/1987 | Lake et al. | 348/584 |
| 5,262,865 A | * | 11/1993 | Herz | 348/705 |
| 5,394,477 A | * | 2/1995 | Zampini et al. | 381/119 |
| 5,499,054 A | * | 3/1996 | Lim | 348/563 |
| 5,511,002 A | * | 4/1996 | Milne et al. | 710/316 |
| 5,848,291 A | * | 12/1998 | Milne et al. | 715/201 |
| 6,072,933 A | * | 6/2000 | Green | 386/46 |
| 6,680,739 B1 | * | 1/2004 | Robertus et al. | 345/581 |
| 7,084,898 B1 | * | 8/2006 | Firestone et al. | 348/14.09 |
| 7,162,314 B2 | * | 1/2007 | Fay et al. | 700/94 |
| 2003/0195998 A1 | * | 10/2003 | Estrop | 709/323 |
| 2004/0218100 A1 | * | 11/2004 | Staker et al. | 348/592 |
| 2004/0223003 A1 | * | 11/2004 | Heirich et al. | 345/629 |
| 2005/0134739 A1 | * | 6/2005 | Bian | 348/600 |

\* cited by examiner

Primary Examiner—M Good Johnson
(74) Attorney, Agent, or Firm—Lee & Hayes, PLLC

(57) ABSTRACT

Compositing functionality is provided in the form of an application program interface (API) that applications can utilize to composite images on video data that is to be rendered. In at least some embodiments, this functionality is exposed in a multimedia pipeline towards the end of the multimedia pipeline, such as at or by a renderer component. A set of methods exposed by the API permit an application to create and manage image compositing.

15 Claims, 6 Drawing Sheets

COMPOSITING EXTERNAL IMAGES INTO A MULTIMEDIA RENDERING PIPELINE

BACKGROUND

Compositing images, such as bitmaps, onto video data that is to be rendered by a multimedia pipeline is typically done in a couple of different ways. For example, an application that wishes for the images to be composited can create its own native component, such as a media source at the front end of the multimedia pipeline. The application can then makes calls to this native component to composite various images on the video data. This approach, however, requires the application to create or otherwise provide its own native pipeline component. In addition, because the native component is located at or near the beginning of the pipeline, there may be a good chance for the data provided by the application to be corrupted by another component in the pipeline.

Alternately, the application can interact more directly with a monitor to which the rendering is to take place and less directly with the multimedia pipeline. Specifically, in this instance, the application may create a particular window on top of the window that is rendered on the monitor. This approach requires the application to be aware of the monitor on which rendering is taking place, as well as any associated nuances of the monitor that might affect compositing.

SUMMARY

In the embodiments described below, compositing functionality is provided in the form of an application program interface (API) that applications can utilize to composite images on video data that is to be rendered. In at least some embodiments, this functionality is exposed in a multimedia pipeline towards the end of the multimedia pipeline, such as at or by a renderer component. A set of methods exposed by the API permit an application to create and manage image compositing. Specifically, the API allows an application to provide one or more images and specify parameters that describe where and how to composite the images. In addition, a method is provided that enables the application to ascertain aspects of a destination surface where rendering is to take place, so that the application can make intelligent decisions as to where to direct compositing to take place.

DETAILED DESCRIPTION

Overview

In the embodiments described below, compositing functionality is provided in the form of an application program interface (API) that applications can utilize to composite images on video data that is to be rendered. The application program interface is embodied in the form of computer-readable instructions that reside on some type of computer-readable media.

In at least some embodiments, this functionality is exposed in a multimedia pipeline towards the end of the multimedia pipeline, such as at or by a renderer component. A set of methods exposed by the API permit an application to create and manage image compositing. Specifically, the API allows an application to provide one or more images and specify parameters that describe where and how to composite the images. In addition, a method is provided that enables the application to ascertain aspects of a destination surface where rendering is to take place, so that the application can make intelligent decisions as to where to direct compositing to take place.

In the discussion that follows, a brief discussion of multimedia pipelines is provided under the heading "Multimedia Pipelines", in order to give the reader some context of an environment in which the inventive embodiments can be employed. Following this, a discussion of an exemplary embodiment, under the heading "Exemplary Embodiment", is provided in which the compositing functionality that is exposed to an application is described. Lastly, a discussion of an implementation example is provided under the heading "Implementation Example" to provide but one example of how the functionality described above can be implemented. This is followed by a section entitled "Captioning Text Implementation Example" that provides but one context in which the implementation example can be employed.

Multimedia Pipelines

The discussion that is provided just below is provided to give the reader some context that pertains to multimedia pipelines insofar as the various embodiments described in this document are intended to be implemented in connection with a multimedia pipeline. It is to be appreciated and understood that this discussion is not to be used to limit application of the claimed subject matter to one particular type of media pipeline. Rather, the inventive embodiments can be employed in connection with any suitable multimedia pipeline without departing from the spirit and scope of the claimed subject matter.

Figure 1:
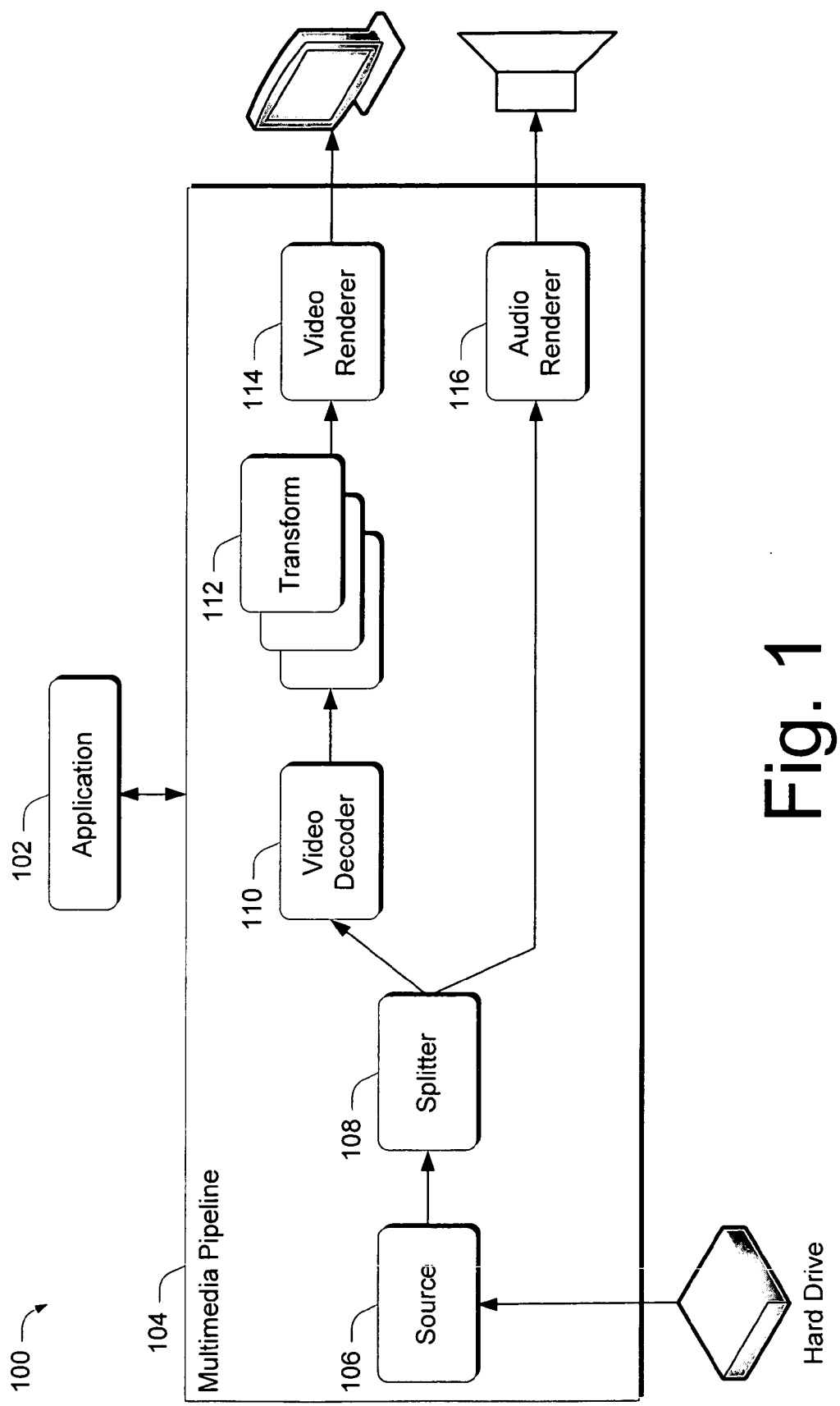
FIG. 1 illustrates aspects of a multimedia pipeline with which the inventive embodiments can be employed.

FIG. 1 shows a system, generally at 100, that includes an application 102 and a multimedia pipeline 104. Typically, these components are implemented in software.

Application 102 can comprise any suitable type of application that utilizes a multimedia pipeline. An example of such an application includes by way of example and not limitation, a media player application that is configured to play multimedia content such as various audio/visual content.

Multimedia pipeline 104 typically includes a number of components that collectively process one or more of audio or video data. In this example, pipeline 104 includes a media source component 106, a splitter component 108, a video decoder component 110, one or more transform components 112, a video renderer component 114 and an audio renderer component 116.

The components of pipeline 104, sometimes termed "filters" in some systems, perform some type of operation on a multimedia stream, such as reading a file, decoding a stream format, and passing data to a graphics or sound card. In the example above, source component 106 acquires the data that the pipeline is to process. In the specifically illustrated example, the data is read from a hard drive. However, data can be acquired from other sources such as streaming sources like various capture devices, the Internet and the like.

Splitter component 108 parses the data into different streams, such as an audio stream and a video stream. Each of the audio and video streams is typically then processed by its own associated components. In this illustration, the portion of the pipeline that processes the audio stream has been simplified to show only audio renderer component. Other components can and typically are utilized to process the audio stream.

Video decoder component 110 decodes the video stream and can provide the decoded video stream to one or more transform components 112 that operate, in some way, on the video stream. Encoders and decoders can be considered as transform components. Renderer components 114, 116 receive data and present the data to a user. For example, a video renderer 114 draws video frames on a display such as the illustrated monitor, and audio renderer 116 sends audio data to the sound card which then transmits the audio data over a speaker.

The above discussion constitutes a very high level description of an exemplary multimedia pipeline. The various specific individual pipelines with which the inventive principles can be employed will likely include specific nuances which, for purposes of the discussion here, are not germane.

EXEMPLARY EMBODIMENT

Figure 2:
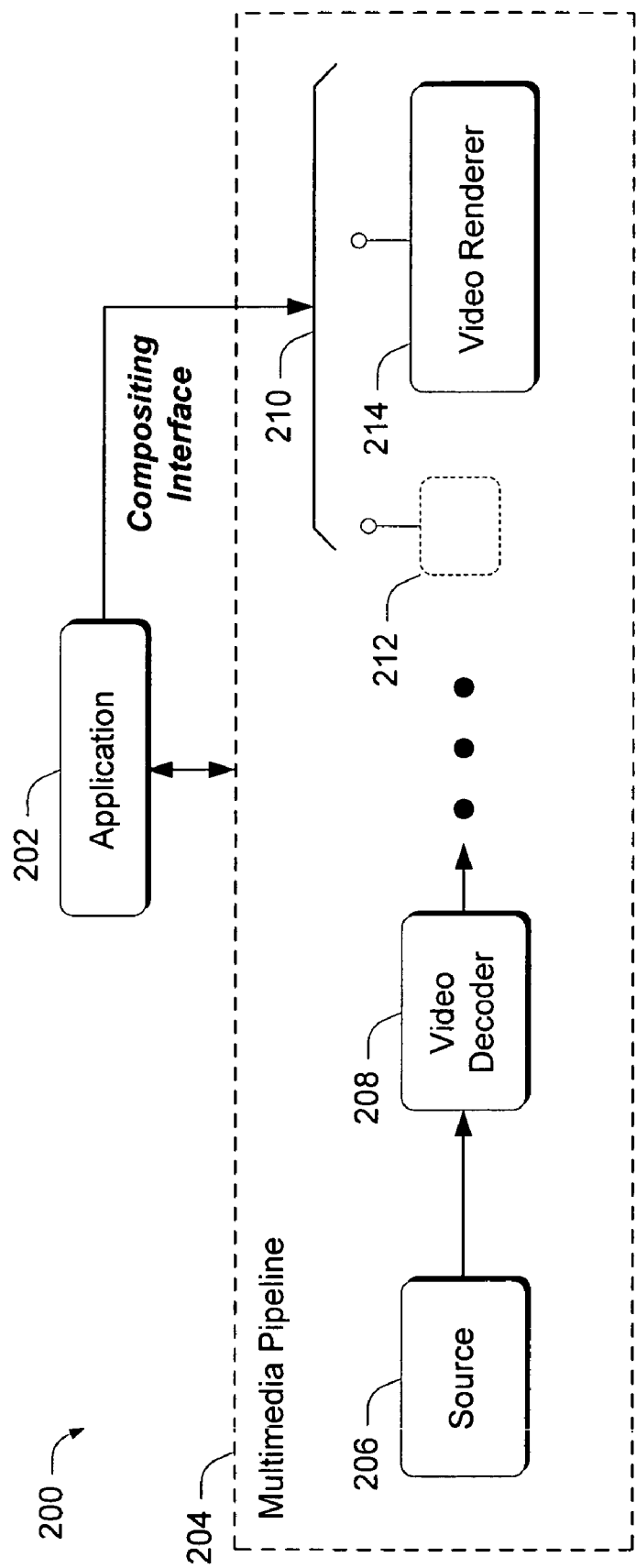
FIG. 2 illustrates an exemplary multimedia pipeline in accordance with one embodiment.

FIG. 2 shows an exemplary system in accordance with one embodiment, generally at 200. Here, system 200 includes an application 202 that is configured to utilize multimedia pipeline 204 to cause multimedia content to be rendered. In the illustrated example, some of the components of the multimedia pipeline have been eliminated for the sake of brevity. However, the illustrated components include a source 206 and a video decoder 208 which operate in the usual way. In addition, multimedia pipeline 204 exposes compositing functionality in the form of an application program interface which is generally represented at 210. Using the application program interface, application 202 can make calls to overlay images over the video that is to be rendered. The interface exposes parameters that enable an application to describe where and how to composite the images over the rendering video.

In the illustrated example, the application program interface that exposes the compositing functionality is represented by the plug notation. In this example, the interface can be exposed at different locations within the pipeline. In the illustrated example, the interface is exposed at or near the video renderer level in the multimedia pipeline. Specifically, a compositor component 212 separate and apart from the video renderer can support the compositing functionality.

Alternately or additionally, the video renderer 214 (or one or more components that are more integrally associated with the video renderer) can support the compositing functionality. That is, the video renderer can directly expose the interface that supports the compositing functionality, or can indirectly expose the interface by virtue of having an internal component expose the interface.

In this particular embodiment, the compositing functionality is exposed at or near the end of the pipeline. By implementing the functionality at or near the end of the pipeline, the chances of data being corrupted by some other component are reduced. However, such functionality could be implemented at any suitable location along the pipeline.

Having now described an exemplary architecture in which the compositing functionality can be implemented, consider now the exemplary application program interface just below. The application program interface can be used by application 202 to provide the images that are to be composited, such as user interface elements, captions and the like. In the discussion just below, the various methods of the interface are presented, followed by a discussion of the methods.

```
interface IWMPVideoCompositor : IUnknown
{
    HRESULT SetComposeMode (
        [in] BOOL fEnable
    );
    HRESULT GetComposeMode (
        [out] BOOL * pfEnable
    );
    HRESULT CreateBitmap (
        [in] DWORD nWidth,
        [in] DWORD nHeight,
        [out] DWORD * pBitmapId ) ;
    HRESULT SetBitmapData (
        [in] DWORD bitmapId,
        [in, size_is ( cbData ) ] BYTE * pbData,
        [in] DWORD cbData
    );
    HRESULT SetBitmapPosition (
        [in] DWORD bitmapId,
        [in] DWORD srcTop,
        [in] DWORD srcBottom,
        [in] DWORD srcRight,
        [in] DWORD srcLeft,
        [in] float fltNormalizedDestTop,
        [in] float fltNormalizedDestBottom,
        [in] float fltNormalizedDestRight,
        [in] float fltNormalizedDestLeft
    );
    HRESULT SetBitmapAlpha (
        [in] DWORD bitmapId,
        [in] float fltAlpha
    );
    HRESULT RemoveBitmap (
        [in] DWORD BitmapId
    );
    HRESULT SetGlobalAlpha (
        [in] float fltAlpha
    );
    HRESULT GetCurrentSurfaceRect (
        [out] RECT *prectCurrentSurfaceRect );
}
```

The SetComposeMode( ) and GetComposeMode( ) methods allow an application to, respectively, enable/disable compositing and ascertain whether compositing is currently enabled.

The CreateBitmap( ) method allows the application to call the compositor and provide the compositor with the width and height of the bitmap that is to be composited and returns to the application a bitmap ID that is to be used in subsequent calls to identify the bitmap. It is to be appreciated and understood that more than one bitmap can be composited at a time. As such, the bitmap IDs enable the compositor to keep the various bitmaps organized in the event there is more than one bitmap.

The SetBitmapData( ) method allows the application to provide the bitmap ID along with the associated bitmap data that is to comprise the composited image.

The SetBitmapPosition( ) method allows the application to specify how much of the bitmap is to be used and where to composite the bitmap. Specifically, this method allows the application to specify the bitmap ID, along with the top, bottom, right and left boundaries of the source bitmap. In addition, the application can specify a normalized top, bottom, right and left destination position (i.e. where the specified source bitmap is to be composited). The source positions are provided as pixel locations and the destination positions are provided as normalized values.

Figure 3:
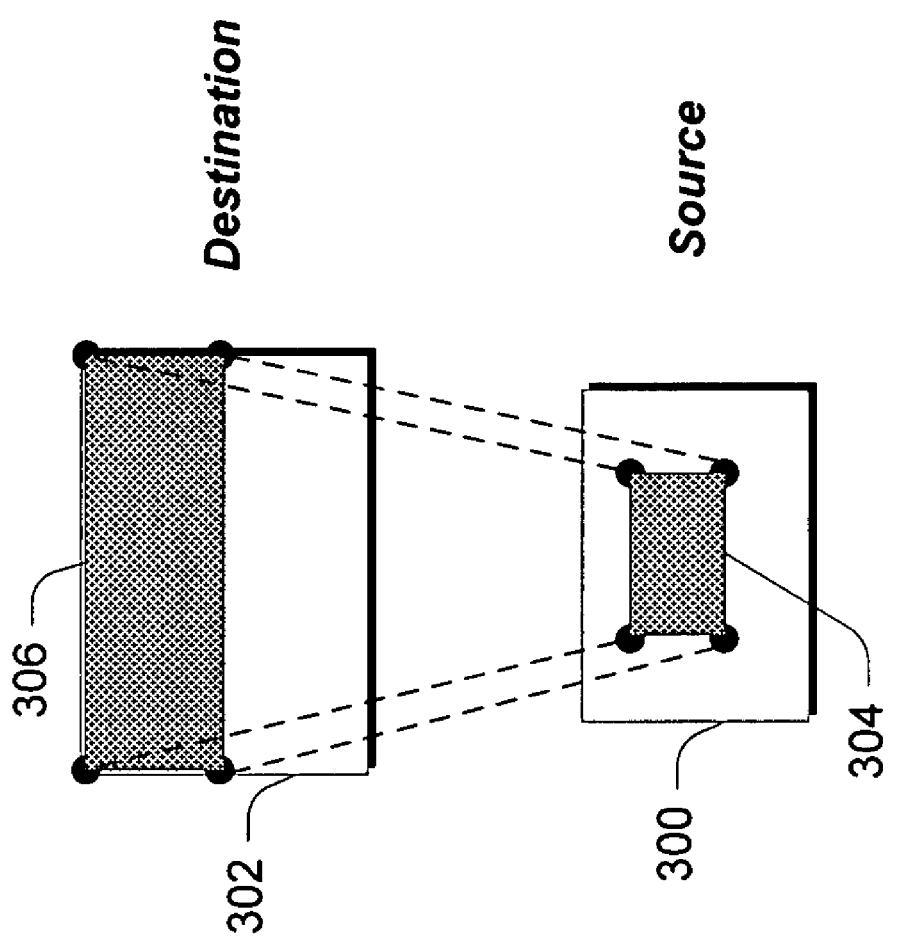
FIG. 3 illustrates mapping of a source bitmap to a destination location in accordance with one embodiment.

As an example, consider FIG. 3 which illustrates a source bitmap 300 and a destination 302 where compositing is to take place. Here, the bitmap position that is set by the application is illustrated at 304. In addition, the normalized destination position in which compositing is to take place is illustrated at 306. In this particular example, the application has specified only a portion of the source bitmap is to be used.

The SetBitmapAlpha( ) method allows the application to specify the bitmap ID and an associated alpha value that is to be used in compositing the bitmap. The alpha value, as will be appreciated by the skilled artisan, defines the transparency of the associated bitmap.

The RemoveBitmap( ) method allows the application to specify, by bitmap ID, a particular bitmap that is to be removed from the compositing process.

The SetGlobalAlpha( ) method allows the application to specify an alpha value that is then used for all of the bitmaps that are composited. In this particular embodiment, for any pixel on the source bitmap, the final alpha value on the destination can be a combination of three different alpha values—the pixel alpha value associated with the pixel (from the bitmap), the alpha value specified for the bitmap by the SetBitmapAlpha( ) method above, and the alpha value specified by the SetGlobalAlpha( ) method.

The GetCurrentSurfaceRect( ) method allows the application to ascertain the current surface rectangle in which rendering can take place. By knowing the dimensions of the current surface rectangle, the application can make intelligent decisions about where to specify compositing. This method is particularly useful because rendering can take place in different modes such as full screen mode. Because the different modes can have surface rectangles with different characteristics, knowing the surface rectangle that is associated with a particular mode can help an application take into account these characteristics when directing compositing activities.

Figure 4:
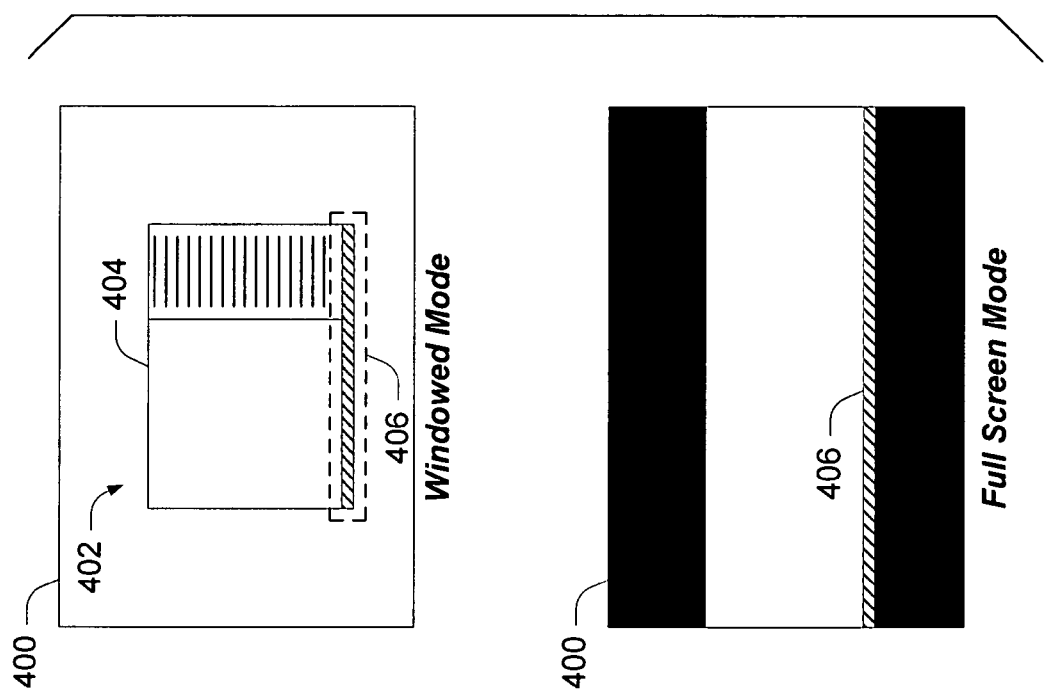
FIG. 4 illustrates aspects of different modes in which compositing can take place.

As an example, consider the following in connection with FIG. 4. There, two different modes are illustrated—a so-called windowed mode and a full screen mode. In the windowed mode, a display 400 (such as a monitor) has a rendered window 402 that presents a user interface 404 such as, for example, a media player interface in which a user can play multimedia content. Assume in this example that the application causes a user interface to be rendered that is, in relative dimension, 16×9. Assume also, for purposes of this example, the current surface rectangle corresponds to the 16×9 user interface. In this particular example, the application has specified for various user interface controls 406 (represented by the cross hatched area) to be composited on the lower portion of the current surface rectangle.

Assume now that the user clicks a control on the user interface and transitions to a full screen mode. In this particular example, because the monitor may be a 4×3 monitor, black bars are rendered on the top on bottom of the display as shown, and the content is rendered in the area that is clear. In addition, because of the new mode, the relative position at which compositing should take place can change as well. Yet, if the application does not take into account these relative changes, the composited interface controls 406 might be rendered at a location in which they are not seen by the user, i.e. in the region occupied by the black bar. Specifically, in the windowed mode, the application may have specified that the interface controls 406 were to be rendered in the bottom 10 percent of the current surface rectangle. Yet, in full screen mode, the bottom 10 percent of the current surface rectangle would result in the composited interface controls being rendered within the black bar that appears at the bottom of the display.

Accordingly, by knowing the current surface rectangle as well as the mode, the application can make an intelligent decision as to how to specify the destination locations in which to composite the images.

IMPLEMENTATION EXAMPLE

Figure 5:
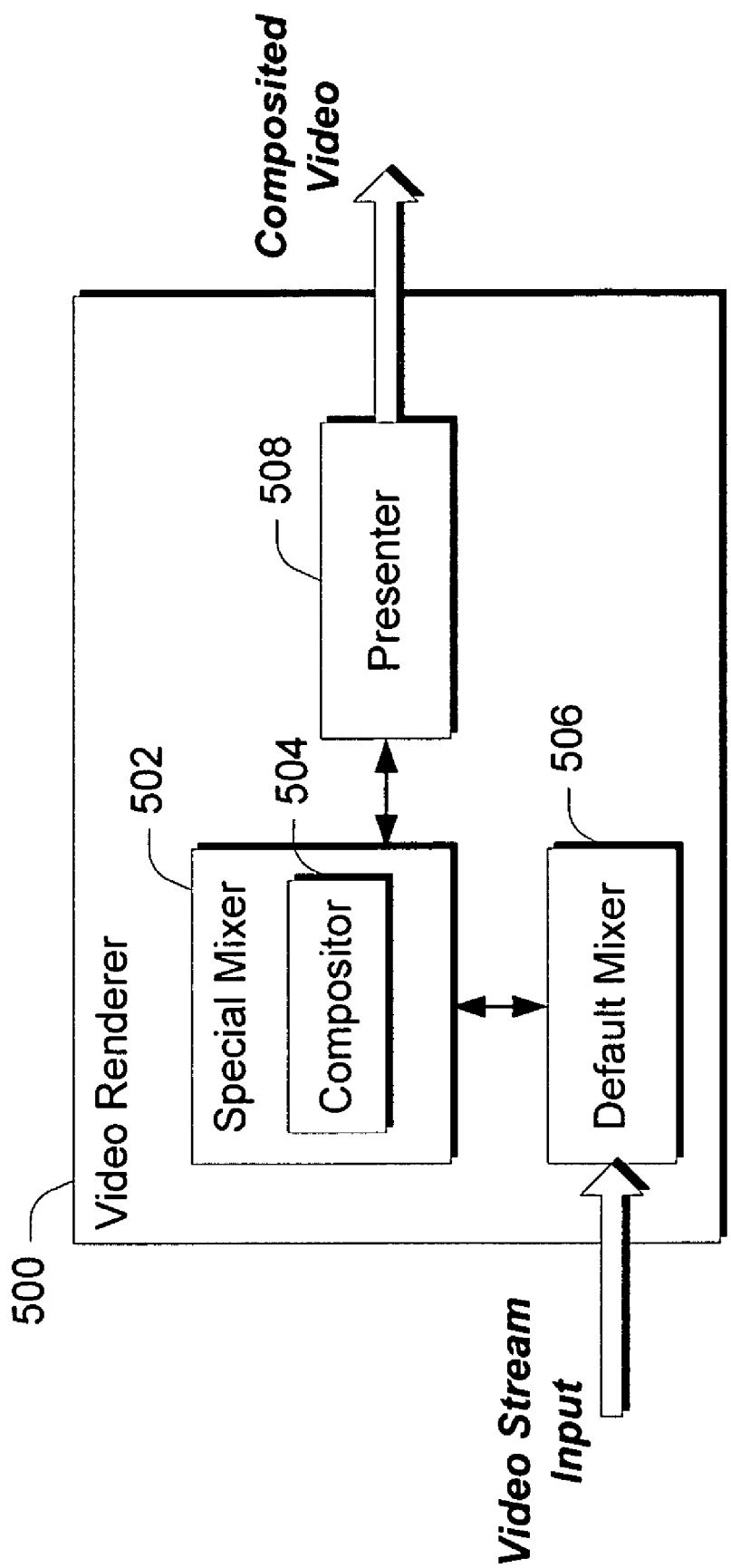
FIG. 5 illustrates an exemplary video renderer in accordance with one embodiment.

FIG. 5 illustrates an exemplary video renderer component 500 in accordance with one embodiment. In this example, the video renderer component comprises a special mixer component 502 having a compositor 504, a default mixer 506 and a presenter component 508. Collectively, the special mixer 502 and default mixer 506 receive and process a video stream from the multimedia pipeline to composite one or more images that are provided by an application. Once composited, the composited video image is provided to the presenter component 508 for presentation on a suitable display.

In this particular example, the application program interface described above is supported by the special mixer 502 which, in effect, wraps the default mixer 506, as will be appreciated by the skilled artisan.

In operation, during rendering, presenter component 508 knows that it needs a particular frame at a particular time. Accordingly, the presenter component calls special mixer 502 to request a frame to display. Special mixer 502 then calls default mixer 506 for the next frame. The default mixer processes the video stream input that is received from the video pipeline in the usual manner. Once a particular frame has been processed by the default mixer 506, it provides the processed frame (or a pointer) to the special mixer 502.

The special mixer 502 then calls the compositor 504 to composite whatever image the application provided to the special mixer. The compositor 504 then overlays the image and provides the frame to the presenter 508 for presentation.

In the implementation described above, the calls that take place between these components are DirectX calls, as will be appreciated by the skilled artisan.

CAPTIONING TEXT IMPLEMENTATION EXAMPLE

Figure 6:
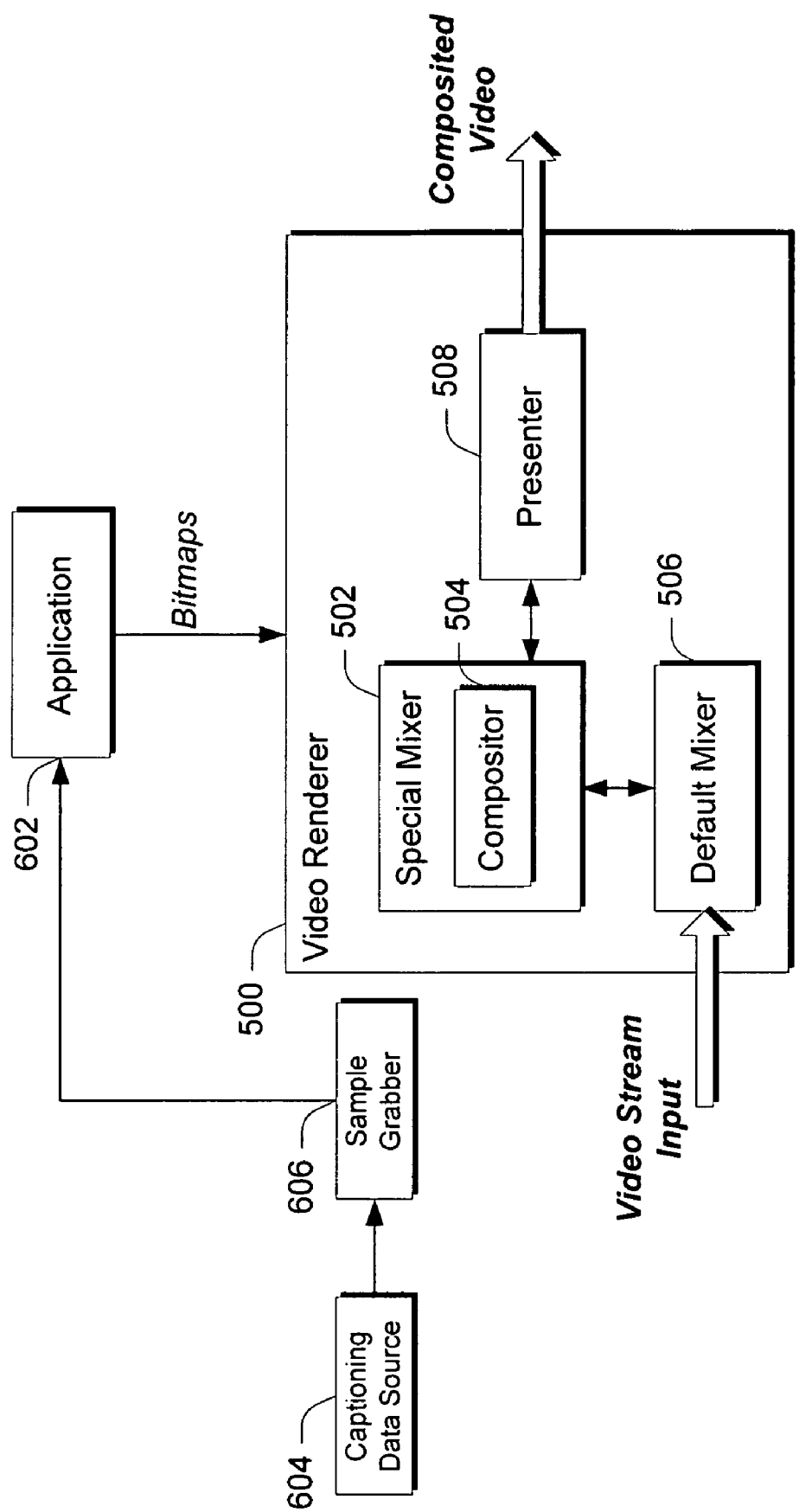
FIG. 6 illustrates context in which the FIG. 5 system can be utilized.

In one implementation example, the above-described embodiments can be utilized to composite captioning text on video data that is rendered for a user. As an example, consider FIG. 6. In this description, like components from the FIG. 5 example have been utilized where appropriate.

Here, a captioning data source 604 is the source of captioning data (i.e. text) that is to be composited onto video data that to be presented to a user. More specifically, the captioning data source reads the captioning data, parses it, and provides it to a sample grabber component 606. Any suitable format of captioning data can be utilized.

The sample grabber component 606 then passes the captioning data across a process boundary to an application, such as application 602. Application 602 can be any suitable application such as the media player application described above. When the application 602 receives the captioning data from the grabber component 606, it converts the captioning data or text to a bitmap. Any suitable conversion process can be used, as will be appreciated by the skilled artisan.

Once converted, the application 602 can use the interface described above, in connection with the system of FIG. 5, to pass the bitmaps across the process boundary to the processing pipeline and, in particular, to mixer 502 and compositor 504 for compositing on to the video data.

The embodiments described above can be implemented using any suitable types of software objects. In but one embodiment, the components are implemented using COM objects. As will be appreciated by the skilled artisan and as described in the example above, using COM objects permits cross process functionality—that is, it permits the interface described above to be used across different processes. Specifically, in some instances, the media processing pipeline will run in a process that is different from the application process. In this case, COM permits the application to continue to use the compositing interface without having to know the details about the pipeline running in the other process.

Conclusion

In the embodiments described above, compositing functionality is provided in the form of an application program interface (API) that applications can utilize to composite images on video data that is to be rendered. In at least some embodiments, this functionality is exposed in a multimedia pipeline towards the end of the multimedia pipeline, such as at or by a renderer component. A set of methods exposed by the API permit an application to create and manage image compositing. Specifically, the API allows an application to provide one or more images and specify parameters that describe where and how to composite the images. In addition, a method is provided that enables the application to ascertain aspects of a destination surface where rendering is to take place, so that the application can make intelligent decisions as to where to direct compositing to take place.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system comprising:
   one or more computer-readable media;
   a video renderer configured to render video content as part of a multimedia pipeline;
   a first video mixer component internal to the video renderer component and having a compositor for compositing one or more images provided by an application on video that is to be rendered by the video renderer, the first video mixer exposing an application program interface that is callable by the application for enabling compositing of the one or more images, wherein the first video mixer is implemented as a COM object, wherein the images provided by the application comprise a user interface wherein the images are callable by the application; and
   a second video mixer configured to receive and process video data from a multimedia pipeline, wherein the second video mixer is callable by the first video mixer for obtaining video frames that have been processed by the second video mixer.

2. The system of claim 1, wherein the application program interface has a method that allows an application to specify at least portions of a source image bitmap and portions of a destination surface where compositing is to take place.

3. The system of claim 1, wherein the application program interface has a method that allows an application to specify an alpha value that is to be used in compositing a source image bitmap.

4. The system of claim 1, wherein the application program interface has a method that allows an application to specify an alpha value that is used for all source image bitmaps that are to be composited.

5. The system of claim 1, wherein the application program interface has a method that allows an application to ascertain a current surface in which rendering is to take place.

6. The system of claim 5, wherein said one method can be used to ascertain the current surface associated with different rendering modes.

7. A computer-implemented method comprising:
   providing a default video mixer that is configured to receive and process video data from a multimedia pipeline, wherein the default video mixer is implemented as a COM object, and;
   wrapping the default mixer with a special video mixer that is configured to call the default mixer to obtain video frames so that the special mixer can enable one or more images to be composited on the video frames, wherein the default video mixer is associated with an application program interface that is callable by an application to provide the one or more images, the images comprising a user interface wherein the images are callable by the application.

8. The method of claim 7, wherein said default video mixer and said special video mixer are internal to a video renderer.

9. The method of claim 7 further comprising compositing said one or more images on one or more video frames.

10. The method of claim 9, wherein the act of compositing is performed by a compositor component internal to the special video mixer.

11. The method of claim 9, wherein the act of compositing comprises compositing captioning data on the one or more video frames.

12. The method of claim 7, wherein the special video mixer is configured to be used cross process.

13. A computer-implemented method comprising:
   calling, with a presenter component, a first video mixer to request a frame to display, wherein the first video mixer is implemented as a COM object;
   calling, with the first video mixer, a second video mixer to request the frame;
   receiving, with the first video mixer, the requested frame from the second video mixer;
   receiving, with the first video mixer, said one or more images from an application, wherein said act of receiving said one or more images is performed cross process, wherein the images from the application comprise a user interface wherein the images are callable by the application;
   calling, with the first video mixer, a compositor to composite one or more images on the requested frame;
   compositing, with the compositor, one or more images on the requested frame; and
   providing the requested frame with the composited one or more images to the presenter component for presentation.

14. The method of claim 13, wherein the act of receiving said one or more images is performed by receiving one or more images comprising captioning text.

15. The method of claim 13, wherein the presenter component, first video mixer and second video mixer are embodied internal of a video renderer.

* * * * *